United States Patent Office 3,036,024
Patented May 22, 1962

3,036,024
WAX COMPOSITIONS
Benjamin G. Post, Bellaire, and Stanley Marple, Jr., and Karekin G. Arabian, Houston, Tex., assignors to Shell Oil Company, a corporation of Delaware
No Drawing. Filed Dec. 21, 1959, Ser. No. 860,695
3 Claims. (Cl. 260—28.5)

This invention relates to wax compositions. More particularly, it relates to novel wax compositions derived from petroleum and especially suitable for use in the coating and impregnation of food cartons and the like, especially dairy food cartons.

Petroleum waxes are broadly divided into several principal classes. The paraffin waxes are normally obtained from lubricating oils distillate fractions but certain flexible waxes which may be referred to generically as iso-paraffin-naphthenic waxes also may be obtained from special distillates. The components of paraffin waxes change character as their molecular weights increase, the structures becoming more complex. Hence, the components present in heavy distillates are not merely high molecular weight homologs of the predominantly normal paraffin waxes contained in lower boiling distillates. On the contrary, they appear to have other structures which provide them with unique properties. Microcrystalline waxes normally occur in the residual lubricating oil fractions and are characterized by their highly-plastic and sticky consistency. In some crude oils, high melting point paraffin waxes occur in conjunction with microcrystalline waxes in residual lubricating oil fractions. They may be separated by fractional crystallization.

Numerous wax products have been isolated by a wide variety of procedures for specific purposes. The normal paraffin waxes melting in the range of about 120–150° F. are characterized by their highly crystalline and brittle nature. Hence, for use in many types of wax compositions they must be modified by incorporation of substantial proportions of other components if they are to be utilized in products suitable at temperatures below room temperature. While it is possible to employ substantial amounts of microcrystalline wax together with paraffin waxes for such purposes as coating of milk carton stock, this has not proved to be entirely satisfactory. Low percentages of microcrystalline wax do not impart appreciable flexibility to paraffin waxes. High percentages impart flexibility but greatly increase the viscosity of the wax composition when it is melted. The latter becomes important during the coating operation, since most coating machines operate within very narrow ranges of tolerance with respect to wax properties.

The balancing of wax properties is not a simple matter, due to the fact that the combination of one wax with another does not necessarily result in an average set of properties. The structure and melting point, as well as other properties, of each of the waxes unpredictably alters the properties of the other wax components, resulting in the formation of a wax compositoin having properties which cannot be calculated or predicted from the properties of the individual waxes. One of the problems involved in compounding such compositions comprises the provision of waxes having both a high degree of tensile strength and flexibility at low temperatures while maintaining an adequate resistance to cracking when the composition is shock chilled such as may occur when cold milk or other dairy foods contact them.

The economic restrictions upon food carton compositions are numerous and the technical limitations imposed by their method of manufacture still further restrict the scope of compositions which may be utilized for this general purpose. For example, the wax consumption per container must be low and yet the wax must produce smooth and even films free of pinholes or other surface defects to provide adequate waterproofness to the container. Secondly, the wax must congeal at a temperature sufficiently high to prevent sloshing of the wax in the bottom of the carton during the rapid directional changes of the carton in the packaging machine cooler box.

In addition to these basic requirements, a superior dairy carton wax must meet the following special requirements during storage and distribution of the dairy carton in normal retail outlets: (1) The wax must be flake-resistant and not form wax flakes which get into milk or other products. (2) The wax must develop a minimum of cracks on the sides or bottom of the container caused by mechanical shock. (2) The wax must have a high tensile strength to minimize bulging of the carton and scuffing of the outer wax coating. Furthermore, of course, the ordinary requirements for food packaging waxes must be met at the same time. In general, the so-called premium dairy waxes usually have from 0.7 to 3% of a polymeric material added to the wax. Formulations currently available in the milk carton wax market do not satisfactorily meet all of the requirements listed above and have a tendency to flake or crack when subjected to the mechanical shocks normally encountered during distribution through retail outlets.

Other problems which occur in the handling and use of wax compositions comprise the "blocking" which results when slabs of wax are stock-piled or coated wax articles are stored in depth. Blocking refers to the tendency of waxes to fuse together under pressure and temperature. It is widely accepted that the higher the blocking temperature of a wax is, consistent with its other necessary properties, the more desirable it is for most uses. Still another property of wax compositions which must be considered is the effect of shock chilling upon the wax surface. If the wax composition is of the type usually employed for many food carton coatings, shock chilling of the coating of wax on the carton from its originally warm condition to a substantially colder condition when the carton is filled with a product such as cold milk, for example, results in the formation of stresses which in turn cause hair-line cracks to occur. The incorporation of microcrystalline wax to improve tensile strength and flexibility will alleviate this condition if sufficient amounts of microcrystalline wax are added. However, as pointed out earlier this may be objectionable for other reasons.

Resistance to shock chilling without materially increasing the melt viscosity of a wax composition can be achieved by the incorporation of certain proportions of low melting isoparaffinic-naphthenic waxes obtained from intermediate boiling distillate waxy lubricating oils. While the results constitute an advance over similar compositions containing microcrystalline wax in some respects, the wax compositions made from intermediate distillates may cause blocking to occur and may also result in too high a flow of the compositions even under cold conditions.

It is an object of the present invention to provide improved wax compositions. It is a particular object of this invention to provide improved wax compositions especially suitable for food carton coatings. It is a further object of the invention to provide coatings especially suitable for dairy food cartons and having improved low temperature properties particularly with respect to flexibility and impact strength. Other objects will become apparent during the following description of the invention.

Now in accordance with the present invention, improved wax compositions are provided, which have solidification temperatures above 128° F. and have the recited low temperature properties so necessary for use in food carton wax compositions, comprising a combination of (1)

heavy distillate petroleum wax, (2) residual microcrystalline wax, (3) isoparafinic-naphthenic plastic distillate wax, (4) fractional proportions of a polyolefin and (5) a special distillate wax of high flexibility obtained as described hereinafter. A still further and extremely important limitation on the compositions of this invention comprises the necessity for maintaining a ratio of substantially non-straight chain waxes to substantially straight-chain waxes above about 1.0 and preferably between 1.0 and 2.0.

The latter qualification comprises one of the major aspects of the invention which, however, must be taken in conjunction with the later-recited ranges of the other several classes of components to be described more fully hereinafter. For convenience throughout the remainder of this specification, the substantially non-straight chain waxes will be generally referred to as "plastic" waxes while the substantially straight-chain waxes will be referred to as "brittle" waxes. Also for means of identification these two classes of waxes may be clearly defined by reference to their ability or non-ability to form crystalline molecular complexes with urea. This can be readily determined by the following procedure: One part by weight of wax is dissolved in 6 parts of methyl isobutyl ketone. Three parts of water which has been saturated with urea at 130° F. are added. An additional amount of urea which corresponds to 4.5 times the weight of the wax sample is added. The mixture is then heated to 130° F. and held at this temperature for 30 minutes with stirring. The solids are removed by filtration or decantation. The solvent and urea are removed from each fraction by distilling or water washing. Any wax portion which forms an adduct is classified as "brittle"—the non-reactive portion is classified as "plastic."

The compositions of the invention should have the following proportions by weight of the various components in order to meet the solidification temperature limitation of about 128° F., the plastic to brittle ratio limitation and the various requirements relative to low temperature performance:

| | Percent by weight |
|---|---|
| Heavy distillate wax, 145–175° F. melting point (1) | 5–20 |
| Residual microcrystalline wax (2) | 10–20 |
| Isoparaffinic-napthenic plastic distillate wax, 102–115° F. melting point (3) | 25–40 |
| Polyolefin, 1000–10,000 average molecular weight (4) | 0.05–1 |
| Split distillate paraffin wax obtained as described hereinafter (5) | 40–60 |

Still more preferred compositions comprise those meeting the following specification:

| | Percent by weight |
|---|---|
| Heavy distillate wax, 150–165° F. melting point (1) | 7.5–15 |
| Residual microcrystalline wax, 135–160° F. softening point (2) | 12.5–17.5 |
| Isoparaffinic-naphthenic distillate wax, 106–115° F. melting point (3) | 27–35 |
| Polyolefin, 1500–4000 average molecular weight (4) | 0.25–0.75 |
| Distillate wax split as described hereinafter, 122–135 melting point (5) | 42–50 |

One of the essential novel components of the above composition comprises the split distillate wax (5) which has unexpectedly been found to impart outstanding low temperature properties to the composition while at the same time avoiding the blocking difficulties referred to earlier in this specification. This special split distillate wax (5) is prepared as follows: In the normal course of petroleum refining, a topped waxy crude is fractionated (by vacuum distillation) to produce lower boiling distillates and relatively higher boiling distillates constituting waxy lubricating oil cuts. It is the usual refining procedure to dewax such lubricating oils in order to obtain low pour point oils on the one hand and deoiled waxes on the other. The usual procedures for dewaxing and deoiling are well known in the art. They constitute the first steps to be utilized in the preparation of a crystalline refined paraffin wax useful for the plitting procedure now to be described.

After a deoiled finished paraffin wax has been obtained as referred to above, this latter wax is then dissolved in a splitting solvent. This solvent may be any one of a number of solvents or mixtures of solvents normally utilized in dewaxing or deoiling procedures. Typical solvents include ketones or aromatics or mixtures thereof as are well known in the art. Species include methyl ethyl ketone or methyl isobutyl ketone. The splitting procedure is normally conducted by dissolving between about 0.2 and about 0.4 part by weight of the distillate paraffin wax in one part by weight of the splitting solvent, warming to a temperature where a single phase is obtained and then cooling to a predetermined temperature whereat only part of the distillate paraffin wax is precipitated in the form of recrystallized wax, the remaining component still being dissolved in the splitting solvent. The precipitated wax is separated from the solution which is then treated so as to remove the solvent and recover the relatively lower melting distillate wax which will be referred to as distillate wax A (5) to be used in the compositions of this invention.

The proportion and identity of the splitting solvents as well as the temperatures at which this separation is made will be chosen so as to produce a desired splitting of the distillate wax consistent with the particular wax being treated. When utilizing such waxes as are obtained, for example, from East Texas crude, it is preferred to employ waxes obtained from waxy lubricating oil distillates boiling between about 650 and 950° F. at 760 millimeters mercury. Under these conditions, the waxes which are obtained before splitting normally have melting points between about 135 and about 150° F. When subjected to the splitting procedure described and particularly when utilizing methyl isobutyl ketone as the splitting solvent and a splitting temperature of about 70° F., the relatively flexible distillate paraffin wax A obtained as the lower melting fraction of this splitting operation normally has a melting point in the order of about 122–135° F. Usually, however, when the mixture of distillate paraffin wax before splitting has a melting point in the order of 138–140° F., a splitting temperature and solvent conditions are chosen to result in a relatively lower melting mixture having a melting point of about 125–127° F. which is then utilized in these wax compositions.

It has been determined that this splitting operation does not merely separate higher melting from lower melting waxes. For example, distillate paraffin waxes obtained by the normal dewaxing and deoiling procedures from a lower boiling waxy distillate have been found to contain no plastic components and 100% of brittle components as defined hereinbefore. However, a wax of the same melting point obtained by the splitting operation just described contains in the order of 20–35% of plastic components, the remainder being brittle wax components. It is this difference apparently in plastic component content which imparts the highly desirable and unpredictable properties to the wax compositions of this invention.

The heavy distillate waxes forming an important component of the present compositions have a melting point of 145–175° F., preferably 150–165° F. Such waxes have a unique set of physical properties which, when combined with the properties of the other components of the composition, give new wax compositions which have greatly improved blocking point, cold flow properties and high fracture resistance upon shock chilling. The heavy distillate waxes are preferably obtained from high viscosity lubricating oil distillate fractions having a Saybolt Universal viscosity at 210° F. of at least 65 seconds and usually between about 65 and 160 seconds. The high viscosity lubricating oil distillate is preferably dewaxed by diluting it with a dewaxing solvent such as naptha or mixed solvents, such as methyl isobutyl ketone and toluene. The diluted waxy oil is cooled to a dewaxing temperature which is predetermined to give a mixture of waxes having the following typical properties:

COMPOSITIONAL ANALYSIS [1]

| Component | Percent v. | Carbon No. Range | Ave. Carbon No. |
|---|---|---|---|
| n-Alkanes | 68 | $C_{22}$-$C_{45}$ | $C_{36}$ |
| Isoalkanes | 8 | $C_{29}$-$C_{45}$ | $C_{35}$ |
| Monocycloalkanes | 17 | $C_{25}$-$C_{46}$ | $C_{37}$ |
| Dicycloalkanes | 6 | $C_{29}$-$C_{46}$ | $C_{40}$ |
| Others | 1 | $C_{34}$-$C_{47}$ | $C_{38}$ |

| Physical Properties: | |
|---|---|
| Melting Point, ASTM D-87 | 158.2 |
| Viscosity, SU at 210° F | 51.4 |
| Color, Saybolt | +28 |
| Refractive Index, $n^{90}/D$ | 1.4351 |
| Oil Content, Percent w., ASTM D-721 | 1.2 |
| Penetration, mm./10, ASTM D-1321— | |
| at 77° F | 12 |
| at 110° F | 40 |
| Tensile Strength, p.s.i., 73° F., ASTM D-1320 | 186 |
| Blocking Temperature, ° F., Gradient Method, Pick/Block | 123/128 |

| Distillation Range, Percent v. Over— | Temperature, ° F. |
|---|---|
| IBP | 675 |
| 20 | 860 |
| 40 | 890 |
| 60 | 916 |
| 80 | 954 |

[1] By high temperature mass spectrometer.

Another essential component of the wax compositions may be referred to broadly as a "plastic wax" which is essential for the production of wax compositions having optimum low temperature properties. This plastic wax is a specially prepared product. The plastic waxes forming a part of the present invention are a mixture of essentially isoparaffinic and napthenic distillate waxes with less than about 35% by weight of n-paraffin waxes, preferably obtained by the following procedure: A waxy lubricating oil distillate boiling within the range from about 650° F. to about 950° F. (at atmospheric pressure) is subjected to solvent dewaxing by means of known selective dewaxing solvents. Preferably, this comprises the combination of a low molecular weight aliphatic ketone and an aromatic hydrocarbon such as benzene or toluene. More specifically, a preferred pair of dewaxing solvents is methyl ethyl ketone and toluene in proportions of between about 2:1 to 1:2 by volume.

A sufficient amount of the dewaxing solvent is employed to completely dissolve the waxy lubricating oil at temperatures in excess of about 120° F., after which the solution is cooled to a dewaxing temperature, preferably in the order of between about −15 to +15° F. At this dewaxing temperature, the slack wax is filtered or centrifuged from the dewaxed oil. The slack wax is in turn subjected to a solvent deoiling procedure preferably using the same type of deoiling solvents. The slack wax is dissolved in the solvent, preferably methyl ethyl ketone mixed with toluene, and cooled to a temperature between about 35° F. and about 50° F., at which point the precipitated refined paraffin wax is filtered. This paraffin wax is treated in accordance with known procedures, such as by repulping or washing on a filter, in order to obtain a fully refined paraffin wax having a melting point between about 135 and about 145° F.

The soft wax mixture left in solution in the solvent is in turn subjected to a deoiling treatment, either by cooling the existing solution down to a point where the plastic waxes crystallize or by removing a sufficient amount of the solvent so that a more concentrated solution of the soft wax is obtained, so that more easily attained deoiling temperatures may be employed. Preferably, the soft wax is dissolved in between about 2 and about 6 parts by weight of deoiling solvents per part of soft wax, heated to a temperature in the order of 120–160° F., and cooled to a temperature between about 30 and 46° F., at which point the plastic waxes precipitate and are removed by mechanical separation such as by centrifuging or filtration. In order to remove the maximum amount of contaminating oil from the precipitated waxes, it is a preferred practice to subject the waxes to washing or repulping or both within the filtration temperature range in order to obtain the desired plastic wax.

The product so obtained has unique properties not found in any wax described in the prior art. It has a melting point within the range from about 108 to about 117° F., a viscosity between about 35 and 45 S.S.U. at 210° F., a refractive index at 70° C. between about 1.4365 and 1.4500 and an oil content as determined by the standard ASTM method D-721 of less than about 0.5%. The penetration of the wax at 77° F. is between about 40 and 80 mm./10 by ASTM Method D1321 54T.

Another essential component of the present compositions comprises one or more olefin polymers having molecular weights which may vary from about 1,000 to about 100,000. Ordinarily these will comprise polymers having average molecular weights of between about 1,500 and about 25,000 although the average may be as high as 50,000. Dependent upon the final use of the composition the olefin polymer may be of the synthetic rubber type, the waxy type or may be resinous or sticky solids. Typical polymers coming within the class of compounds contemplated include polyethylene and polypropylene copolymers of ethylene and propylene and mixtures of the above homopolymers or mixtures of copolymers thereof. Consequently, the polymers contemplated preferably comprise polymers of monoolefins having monomeric units of 2–3 carbon atoms.

The polyethylenes are preferred for use in the present compositions and those employed in the preparation of wax papers may be generally described as ethylene polymer waxes which are frangible solids as distinguished from tough rubberlike polymers. Ethylene polymer waxes are obtained, for example, by pyrolysis of the rubberlike solid ethylene polymers, such as those obtained according to U.S. Patent No. 2,153,553. The methods for the preparation of ethylene polymers of either a waxlike or rubbery character are well known. Preferred materials have approximate average molecular weights between about 2,000 and 15,000 and melt between about 200 and 250° F. They have tensile strengths in the order of 800–2000 p.s.i. at 25° C. and ultimate elongations of 50–400% at 25° C.

While these polymers may be present in amounts up to 5.0% by weight of the composition, they are usually present in amounts of less than about 2.0% by weight of the essential 3-component composition and preferably of amounts less than about 1.5%. They may be added to the wax compositions in amounts as little as 0.05% for certain purposes but usually will be present in amounts between about 0.1 and about 1.5, while optimum results are obtained for most purposes when using between about 0.5 and about 1.25 based on the total composition.

Residual microcrystalline waxes are employed in conjunction with the other components described above. These mixtures are utilized especially for imparting improved tensile strength to the compositions at the temperatures to which they are normally subjected. The microcrystalline waxes are distinguished by their amorphous or extremely fine crystalline structure and comprise highly branched or napthenic hydrocarbon waxes of relatively high molecular weight. The term "microcrystalline wax" is understood to be substantially synonymous with other common designations, such as "amorphous wax." These waxes are obtained from residual lubricating oil fractions and normally have melting points within the range of from about 135 to about 160° F., preferably 140–155° F. They usually have brittle points between about −5° F. to about +30° F. and have refractive indices from about 1.4430 to about 1.4480 (sodium D line at 90° C.).

The following comparative data in Table 1 illustrate the advantages to be gained by use of the compositions of this invention. According to the data, it will be seen that three samples were compared. Example 1 constitutes the composition according to this invention. Example 2 is a corresponding composition except that the distillate paraffin wax having a 124–126° F. melting point was obtained from a lower boiling waxy oil distillate than was the wax A with which it was compared in Example 1. It is noteworthy that the inches of cracks developed in the impact test by the composition of the invention (Example 1) were only half as great as those developed by the comparative compositon of Example 2. Consequently, it will be seen that the plastic to brittle ratio which is also given in the table is not the only criterion of excellence in low temperature tests since all of the examples shown in the table have plastic to brittle ratios of at least 1. This emphasized by Example 3, wherein the distillate paraffin wax is the finished paraffin wax from which wax A (utilized in Example 1) was obtained by splitting. It is noteworthy in this case that the inches of cracks developed in the impact strength in Example 3 composition was more than three times that developed in the composition of the invention, namely, Example 1.

TABLE I

*Effect of Narrow Range FRP Fraction*

| | Example | | |
|---|---|---|---|
| | 1 | 2 | 3 |
| Composition, parts by weight: | | | |
| 124–126 FRP, wide range (from 250 distillate) | | 45 | |
| 125–127 FRP, (Wax A, split from 138–140 wax) | 45 | | |
| 138–140 Wax | | | 45 |
| 158–162 Heavy distillate wax | 10 | 10 | 10 |
| Soft wax fraction, 110° F., M.P. | 30 | 30 | 30 |
| Microcrystalline wax, 145° M.P. | 15 | 15 | 15 |
| Polyethylene | 0.5 | 0.5 | 0.5 |
| Properties: | | | |
| Impact strength, inches of cracks at 45° F. | 6 | 12 | 19 |
| Plastic: Brittle Ratio | 1.6 | 1.0 | 1.2 |

A comparison was made between a wax composition of the invention and a comparative dairy carton wax. The data given in Table II show the improvement in essential properties gained by utilizing the split paraffin wax and microcrystalline wax so as to have a plastic-to-brittle ratio over 1.0.

TABLE II

*Performance in One-Half Gallon Carton-Making Machine*

| | Comparative Dairy Carton Wax | Composition of the Invention |
|---|---|---|
| Plastic to Brittle Ratio | 0.6 | 1.6 |
| Composition: | | |
| 138/140° F., M.P., paraffin wax | 65 | |
| 158/162° F., M.P., heavy distillate wax | 10 | 10 |
| 145° F., M.P., microcrystalline wax | | 15 |
| Isoparaffinic-napthenic wax, 110° F., M.P. | 25 | 30 |
| 125/127° F., "Distillate paraffin was A" [1] | | 45 |
| 2,000 mol. wt. polyethylene | 0.25 | 0.25 |
| Performance: | | |
| Consumption, #1,000 cartons for good coverage | 47–48 | 49–50 |
| Serpentine Rating 0=excellent coverage | 0 | 0 |
| Machine Cracks [2] | Yes | No |
| Bulge, 1/32 inch | 7–8 | 7–8 |
| Results after 6 drops from a Height of 7 inches at 45° F. (machine-filled 1/2 gallon containers): | | |
| Loose strings | 12–25 small slivers | 0 |
| Loose flakes | 1–2 large flakes | 3–5 small flakes |
| Total inches of cracks on bottom | 6 | 3 |

[1] Made by splitting 138/140° F. paraffin wax.
[2] Cracks which appear on the machine-filled cartons during machine filling.

We claim as our invention:

1. A wax composition having a solidification temperature above 128° F. comprising:

| | Percent by weight |
|---|---|
| Heavy distillate wax, 145–175° F. melting point | 5–20 |
| Residual microcrystalline wax | 10–20 |
| Isoparaffinic-naphthenic plastic distillation wax, 102–115° F. melting point | 25–40 |
| Poly $C_{2-3}$ olefin, 1,000–10,000 average molecular weight | 0.05–1 |
| Distillate wax A obtained by dewaxing a waxy petroleum distillate to obtain a crude wax, deoiling the crude wax to obtain a finished wax, solvent splitting the finished wax to obtain a higher melting wax B as a crystalline wax at the splitting temperature and a lower melting distillate wax A soluble in the splitting solvent at the splitting temperature and removing fraction B, wax A having a melting point of 122–135° F. and containing 20–35% non-straight chain waxes, the remaining components of wax A being substantially straight chain waxes | 40–60 | the weight ratio of substantially non-straight chain waxes to substantially straight chain waxes in the composition being between about 1.0 and about 2.0.

2. A wax composition having a solidification temperature above 128° F. comprising:

| | Percent by weight |
|---|---|
| Heavy distillate wax, 150–165° F. melting point | 7.5–15 |
| Residual microcrystalline wax, 135–160° F. softening point | 12.5–17.5 |
| Isoparaffinic-napthenic distillate wax, 106–115° F. melting point | 27–35 |
| Polyethylene, 1500–4000 average molecular weight | 0.25–0.75 |
| Distillate wax A, 122–135° F. melting point, wax A containing 20–35% non-straight chain waxes, the remaining components of wax A being substantially straight chain waxes | 42–50 | the weight ratio of substantially non-straight chain waxes to substantially straight chain waxes in the composition being between about 1.0 to about 2.0.

3. A wax composition having a solidification temperature above 128° F. comprising:

| | Percent by weight |
|---|---|
| Heavy distillate wax, 158–162° F. melting point | 10 |
| Isoparaffinic-napthenic distillate wax, 110° F. melting point | 30 |
| Residual microcrystalline wax, 145° F. softening point | 15 |
| Polyethylene, 2000 average molecular weight | 0.5 |
| Distillate paraffin wax A, 125–127° F. melting point, wax A containing 20–35% non-straight chain wax, the remaining components of wax A being substantially straight chain waxes | 45 | the weight ratio of substantially non-straight chain waxes to substantially straight chain waxes in the composition being between about 1.0 to about 2.0.

References Cited in the file of this patent

UNITED STATES PATENTS

| 2,728,735 | Anderson | Dec. 27, 1955 |
| 2,808,382 | Jakaitis | Oct. 1, 1957 |